Feb. 16, 1965  T. VAN DER FEER  3,169,539

ROLL FILM WASHER

Filed Nov. 21, 1963  2 Sheets-Sheet 1

INVENTOR.
Tom Van der Feer
BY Polachek & Saulsbury
ATTORNEYS.

Feb. 16, 1965  T. VAN DER FEER  3,169,539
ROLL FILM WASHER

Filed Nov. 21, 1963  2 Sheets-Sheet 2

INVENTOR.
Tom Van der Feer
BY
Polacheck & Saulsbury
ATTORNEYS.

3,169,539
ROLL FILM WASHER
Tom van der Feer, Newark, N.J., assignor to Jan Photo Products, Inc., Newark, N.J., a corporation of New Jersey
Filed Nov. 21, 1963, Ser. No. 325,326
1 Claim. (Cl. 134—177)

This invention relates generally to film washers and more particularly to new and useful improvements in a roll film washer for 120, 127 and 35 mm. roll film, wound on Nikor type reels.

Heretofore, washers of this type with which applicant is aware drained from the top leaving considerable hypo on the film negative. The present invention is based on the principle that hypo and chemicals are heavier than water and the draining is made from the bottom.

A principal object of the present invention is to provide a film washer that is effective in removing the hypo solution or used chemical or residue clinging to the film after developing and fixing, in quick time.

Another object of the invention is to provide a device for washing a roll or rolls of film wherein the cleaning liquid is directed against the roll film tangentially in whirlpool fashion.

A further object of the invention is to provide a cylindrical transparent washer with drainage means at the bottom of the body of the washer.

Still another object is to provide a cylindrical washer with a removable cover carrying a nozzle for attachment to a hose connected to a source of water supply.

It is also an object of the invention to provide a cylindrical washer for a roll film that is sanitary, easily cleaned, simple in construction, pleasant in appearance, economical to manufacture and efficient for the purpose intended.

For further comprehension of the invention and of the objects and advantages thereof, reference will be had to the following description and accompanying drawings and to the appended claim in which the various novel features of the invention are more particularly set forth.

In the accompanying drawings forming a material part of this disclosure:

Figure 1:
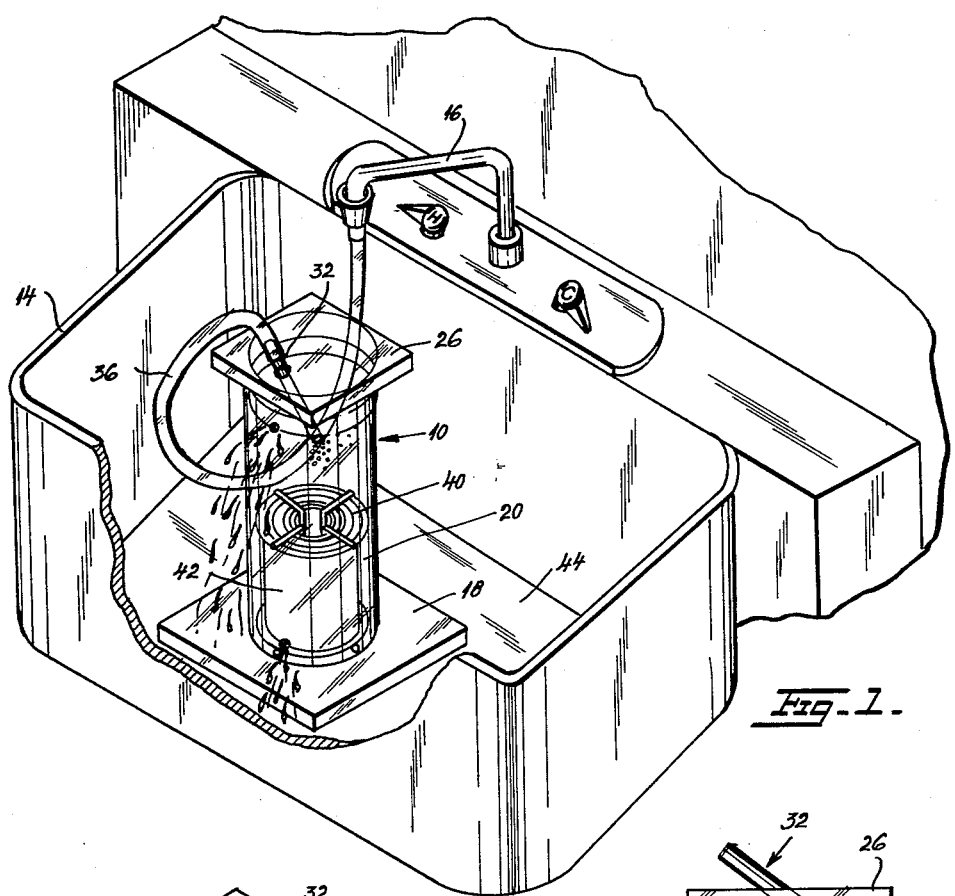
FIG. 1 is a front perspective view of a film roll washer embodying the invention mounted in a sink and operatively connected to a source of water supply, part of the sink being broken away, a film roll being shown in position for cleaning.

Referring now in detail to the various views of the drawings, in FIG. 1, a film washer made in accordance with the present invention is indicated generally at 10 and shown placed in a sink 14 and operatively connected to a faucet 16 of a source of water supply.

Figure 2:
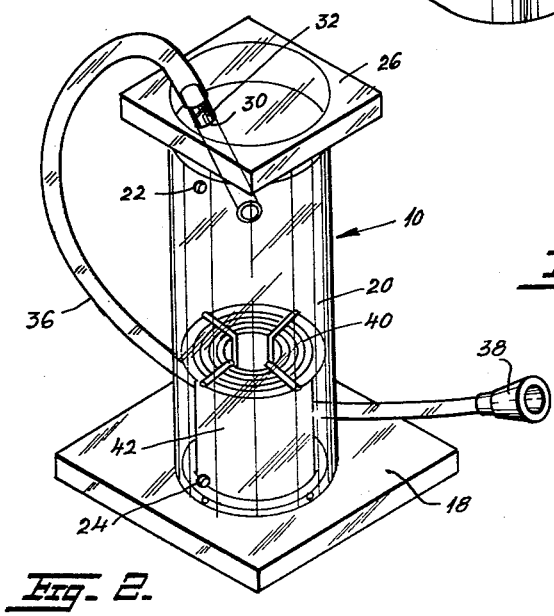
FIG. 2 is a front perspective view of the film roll washer per se, with a film roll and its holder reel therein.
Figure 3:
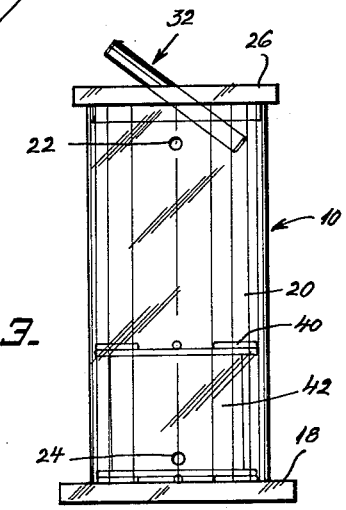
FIG. 3 is a side elevational view thereof, without the hose.
Figure 4:
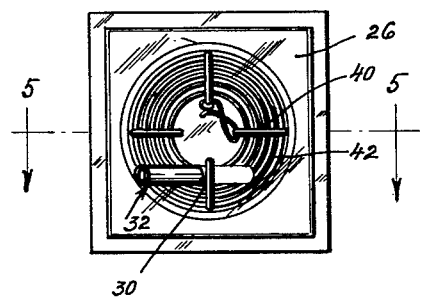
FIG. 4 is a top plan view thereof, without the hose.
Figure 5:
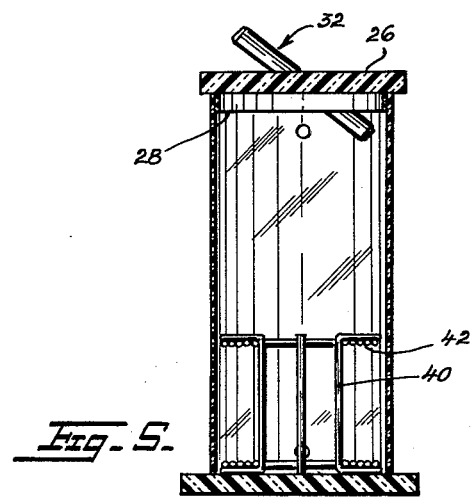
FIG. 5 is a vertical sectional view taken on the plane of line 5—5 of FIG. 4.
Figure 6:
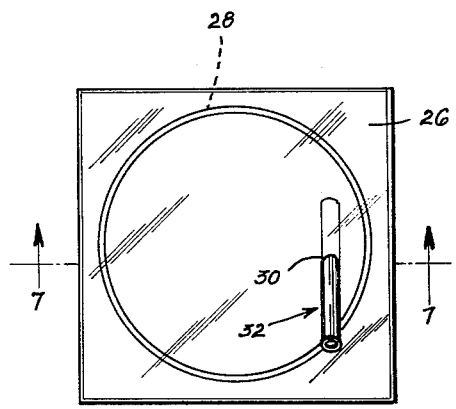
FIG. 6 is a top plan view of the lid or cover on an enlarged scale.
Figure 8:
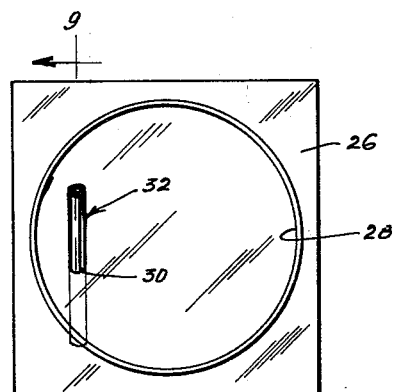
FIG. 8 is a bottom plan view of the lid or cover.
Figure 7:
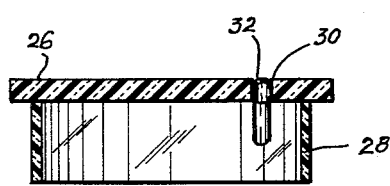
FIG. 7 is a sectional view taken on the line 7—7 of FIG. 6.
Figure 9:
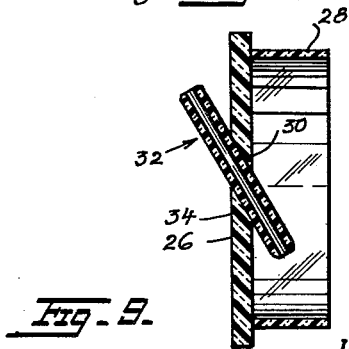
FIG. 9 is a sectional view taken on the line 9—9 of FIG. 8.

The film washer 10 as shown in FIGS. 2 and 3 is preferably formed of transparent plastic material. The washer is formed with a square-shaped base 18. A tubular body 20 is open at both ends and supported in an upright position on the base 18 at the center thereof, the base forming the bottom closure. Adjacent the top and bottom, the body is formed with aligned discharge holes 22 and 24, respectively, on opposed sides thereof.

In accordance with the invention, a square-shaped lid or cover 26 similar in shape to the base 18 is provided for removably sealing the open top of the body. The cover has an annular depending flange 28 adapted to fit inside the peripheral top edge of the body with the body of the cover seating on the top edge of the body as shown in FIGS. 2 and 3. Adjacent one side, the body of the lid or cover is formed with an opening 30 extending through the body of the lid at a slight angle to the vertical. An elongated tubular member 32 extends through said opening protruding above and below the lid and secured in place by adhesive 34 or the like. The tubular member is inclined at an angle to the horizontal with one end above the body of the lid and the other end below the body of the lid. Furthermore, the tubular member is disposed close to and at a tangent to the inner surface of the annular flange 28 and disposed at a tangent to the inner surface at the top of the tubular body, the inner end of the tubular member being directed against the inner surface of the tubular body. The tubular member 32 constitutes a nozzle. The outwardly protruding end of the tubular member or nozzle 32 is adapted to receive and mount one end of a flexible hose 36, the other end of which has a socket 38 for connection to a source of water supply.

In operation, the cover or lid 26 is removed and a reel 40 with a roll film 42, therearound, in spaced coiled formation, sought to be cleaned, is inserted therein as seen in FIGS. 1 to 3, inclusive, the reel resting on the base 18 in upright condition exposing the surfaces and edges of the film. So as to be washed at the same time, other reels with the same or other size films can be stacked in the washer. The cover is restored to closed condition. The film washer 10 with the reels and roll film therein are now placed on the base 44 of the sink 16 or the like. One end of the hose 36 is attached to the outer end of the tubular member or nozzle 32 and the other socketed end 38 of the hose is connected to the end of the faucet 16 of the source of water supply.

When the water is turned on, the water discharges through the inner end of the tubular member or nozzle 32 under pressure, the water being directed tangentially against the inner surface of the body 20 of the washer, falling to the bottom of the body where the reel with film is located. Continued pressure of water in this fashion causes a whirlpool action in the water around the film whereby any hypo solution or used chemical or residue still clinging to the film surface will be released and washed off the film and drained through the bottom openings 24. Reels of any height, and any number of reels capable of fitting in the body, may be washed simultaneously, and if the water level builds up to the top openings 22, the water will drain through said top openings as will be understood.

While I have illustrated and described the preferred embodiment of my invention, it is to be understood that I do not limit myself to the precise construction herein disclosed and that various changes and modifications may be made within the scope of the invention as defined in the appended claim.

What is claimed is:

A device of the character described comprising a base, a vertically disposed tubular body secured to said base and extending upwardly therefrom, a removable cover by which the open upper end of said body is adapted to be closed, said cover being provided with a downwardly extending short annular flange which is adapted to be telescopically inserted into the upper end of said body to secure said cover to the upper end of said body; an elongated tubular nozzle, through which a cleaning liquid is adapted to be projected under pressure into said body, permanently secured in fixed position in an aperture in said cover adjacent said annular flange with the inlet end thereof disposed above the outer surface of said cover and the discharge end thereof disposed below the inner surface of said cover, said nozzle being disposed in a vertical plane which is radially spaced from and perpendicular to a vertical plane passing through the common axis of said body and said cover, and at an angle to the horizontal whereby a whirling movement is imparted to cleaning liquid discharged from said nozzle downwardly against the inner wall of said body; and discharge openings adjacent the upper and lower ends of said body.

References Cited by the Examiner
UNITED STATES PATENTS

| | | | |
|---|---|---|---|
| 2,246,104 | 6/41 | Osuch | 134—155 X |
| 2,642,369 | 6/53 | Hunter | 134—138 X |
| 2,697,341 | 12/54 | Thomas | 134—153 X |
| 2,712,826 | 7/55 | Schleyer | 134—139 |
| 2,831,488 | 4/58 | Anderson | 134—138 |
| 3,070,254 | 12/62 | Carse | 220—82 X |

CHARLES A. WILLMUTH, *Primary Examiner.*

J. G. NORTH, *Examiner.*